3,595,670
PROCESS FOR ALTERING THE MOISTURE ABSORPTIVE CHARACTERISTICS OF READY-TO-EAT BREAKFAST CEREAL

John F. Maloney, Jr., and Theodore W. Craig, Minneapolis, Minn., assignors to General Mills, Inc.
No Drawing. Filed July 31, 1968, Ser. No. 748,914
Int. Cl. A23l 1/10
U.S. Cl. 99—83
6 Claims

ABSTRACT OF THE DISCLOSURE

A process for the treatment of a ready-to-eat breakfast cereal which comprises the addition of hydrophobic siliceous materials to the surface of the ready-to-eat breakfast cereal. The presence of hydrophobic siliceous materials on the surface of a ready-to-eat breakfast cereal will slow the absorption of milk, water or the like, by the breakfast cereal.

---

The product of this invention is a ready-to-eat breakfast cereal which has been surface treated with hydrophobic siliceous materials. The reason for so treating is to retard the rate and/or amount of uptake of an aqueous solution, most especially to retard the absorption of milk or the like by the ready-to-eat breakfast cereal. It has long been the desire of the ready-to-eat breakfast cereal industry to change the absorptive characteristics of their individual products when placed in a milk environment prior to eating. While the products of the ready-to-eat breakfast cereal industry have gained wide acceptance, one of the reasons why the products have not gained an even greater acceptance is the fact that they tend to become soggy when placed in milk and allowed to sit for the time needed to consume them. By the process of our invention, we so alter the surface characteristics of the individual cereal units that there is a substantial improvement in the retention of a crisp mouth feel after the ready-to-eat breakfast cereals have been placed in milk, cream or the like.

By ready-to-eat breakfast cereals, we mean those products which are produced from cereal grain and subjected to a starch gelatinization step. The ready-to-eat breakfast cereals may be in a variety of shapes and may be subjected to a variety of additional processing steps. Some of these are toasting, drying, cooking and puffing, either of the explosive or non-explosive variety, and the like. In order to make these products edible, however, they all must undergo some measure of starch gelatinization. It is, or course, not necessary that the ready-to-eat breakfast cereal be in the form of the initial grain. Many of the cereals are extruded into a variety of shapes after a dough has been made, comprised of at least one of the common cereal grains and water. Sugar, fat and a variety of other flavoring materials may be present within the dough or sprayed on the surface of the cereal product.

By hydrophobic siliceous materials, we mean silicon containing materials, either naturally occurring or artificially made, which may be made either partially or completely hydrophobic by treatment with a hydrophobing agent. Examples of these materials which may be rendered partially or completely hydrophobic are amorphous, natural, and synthetic silicon oxides, i.e. silicas. An example of the naturally occurring variety is diatomaceous earth. Examples of the synthetic variety are precipitated silicas, fumed silicas, and silica aerogels. Other silicon containing materials which may be used are the mono, di or tri-substituted organosilanes such as monomethyltrichlorosilane, dimethyldichlorosilane or trimethylmonochlorosilane.

Partially to completely hydrophobic siliceous materials may be prepared by coating or impregnating the normally hydrophilic siliceous materials with a suitable hydrophobing agent. For example, hydrophilic silicas may be coated with a fluid organo-silicon compound such as a liquid organo-silicon polymer, or with an organo-silicon compound which forms in situ an organo-silicon polymer or resin which is a liquid and/or a solid. Depending upon the method employed for coating and the organo-silicon compound to be used, it may be necessary to heat treat the coated or impregnated siliceous compounds for appropriate periods of time in order to attain the necessary hydrophobic properties. Temperatures of 60° to 800° C. for periods from 2 minutes to 24 hours may be used depending upon the hydrophobic agent and the siliceous material to be treated, the higher temperatures, of course, corresponding to the shorter times.

There are a number of ways to achieve the coating of the hydrophobing agent on the silica and these are well known in the silica treatment art.

Examples of some of the compounds which may be used are the methylated silicas having the formula

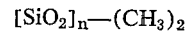

and having a structure of

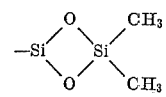

or they may be in the form of a silica crystal lattice with methyl groups attached at any number of available hydroxide sites at the surface of the crystal. This crystal would have the formula given as follows:

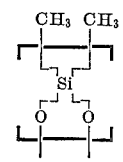

This compound has methyl groups as the terminal portions of the crystal structure. These methyl groups are what provide hydrophobic characteristics of the material, it is believed. While any amount of methylation of the terminal group will provide some amount of hydrophobicity, the higher the degree of methylation, the higher the resistance of this compound to wetting with water. The methyl groups, of course, are merely an example of a hydrophobic group attached to the end of this crystal structure. Obviously, any alkyl or aromatic group which forms non-toxic compounds would be suitable for the purposes of this invention.

Other compounds which may be used to make the product of our invention are the modified silanes. Examples of these are the halogen substituted silanes containing at least one organic group, specifically silanes containing methyl and chlorine groups, for example monomethyltrichlorosilane, dimethyldichlorosilane and trimethylmonochlorosilane. These types of compounds are thought to increase the hydrophobicity of the ready-to-eat breakfast cereals by bonding directly with the free hydroxyl groups on the cereal surface. This is in contradistinction to the methylated silicas and the crystal silicas mentioned earlier. These compounds are thought to be bound to the cereal surface at the site or organic groups present on the cereal surface by Van der Waal's forces. The choice of the starting material, then, to some extent will be determined by the surface characteristics of the cereal.

The surface characteristics of ready-to-eat breakfast cereals may be altered by adding fat or certain other agents such as proteins which are somewhat non-polar in nature, e.g. zein, a corn derived protein, and using the polymer forming substances to produce the hydrophobicity desired. These factors will be explained in more detail subsequently.

The substituted silanes, i.e. the organo-silanes previously mentioned, react with the cereal surface to form, it is believed, two separate reactions. First, as mentioned previously, is the attachment of the silica to the free hydroxyl groups on the cereal surface with the hydrogen combining with the chlorine (or other reactive member) from the methylchlorosilanes to produce a silane having methyl groups at its surface extending away from the cereal and being attached to the cereal by the oxygen containing compounds present on the surface. The equation is believed to be the following:

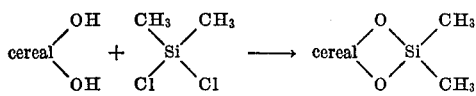

This reaction is an anhydrous one. In the presence of available water, it is believed that a polymeric silicone is formed on the surface of the flake. This reaction is believed to be as follows:

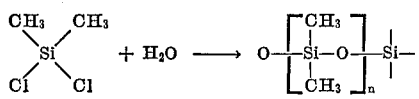

It is believed that in most circumstances both reactions take place. An example of another organo-silane which has been used is diphenyldimethoxysilane. The reaction proceeds somewhat in the manner of the chlorosilanes, although are generally somewhat less effective as a moisture barrier.

It should be noted that while all of these compounds serve as a moisture barrier, they are talking about moisture in the liquid phase. These compounds do not seem to serve as any sort of a barrier to water vapor.

In order to measure the effects of the treated cereal flakes, a test was devised to measure the tendency to absorb moisture and become soggy. It was felt that when sufficient milk was absorbed by the cereal so that there was twice the amount of milk by weight with cereal present, the cereal was soggy. With this in mind, the following test was devised. By measuring the amount of time it takes for two grams of milk to be absorbed by one gram of cereal in a standard cereal and dividing this number into the amount of time it takes for two grams of milk to be absorbed onto one gram of a hydrophobically treated ceral, a value is arrived at which reflects the hydrophobic character of the treated cereal. This value is called the "sog index."

An example of a comparison of values obtained by use of the "sog index" follows. As mentioned previously, it may be necessary to modify the surface character of some of the ready-to-eat breakfast cereals treated with siliceous material to obtain the type of performance desired. It has been discovered that the surface character of the cereal and whether or not the grain is coated with fat affects the binding properties and subsequently the hydrophobic characteristics of some of the siliceous materials. For example, corn flakes when treated with a hydrophobic silica have a "sog index" of six. A wheat flake when treated with the same material has a "sog index" of 1.7. This value, however, is substantially raised when the wheat flake is coated with either fat or zein, a corn-derived protein.

Examples of the products and process of our invention follow. These examples are illustrative of the large variety of ready-to-eat breakfast cereals which may be processed according to the teachings of this invention. These examples are also illustrative of the effects of added material on the surface of the ready-to-eat breakfast cereal prior to the treatment with the hydrophobic siliceous material and the effect on the "sog index" of these added materials.

EXAMPLE I

The ready-to-eat breakfast cereals used in Example I were coated with "Organ-O-Sil" S–5, a treated fumed silicon dioxide which has been made hydrophobic by treatment with dichlorodimethylsilane. "Organ-O Sil" is a trademark of the Cabot Corporation, 125 High Street, Boston, Mass. The physical constants for "Organ-O-Sil" S–5 are as follows:

BET surface area ($N_2$ adsorption)—175 m.$^2$/g.
Carbon content—1.4%
Ignition loss (½ hour at 1000° C.)—1.3%
Moisture loss (1 hour at 105° C.)—0.11%
pH (4 g. in 100 cc. of 1:1 methanol/water mixture)—4.0
Surface hydroxyls—0.39 meq./g.
Color—white
Bulking value—6.33 gal./100 lb.
Pore density—2.5 lbs./cu. ft.

NOTE:
(BET in the surface area description is an abbreviation for Brunauer, Emmett and Teller which is the term used to designate an equation and method for determining a surface area of an adsorbent material.)

"Organ-O-Sil" was applied to several types of cereals by placing about 0.5 gm. along with 100 gms. of cereal in a bag and shaking gently. The excess "Organ-O-Sil" was blown off with a gentle air stream. The coating on the cereal was barely visible to the naked eye. The cereals were then placed in milk and the sog index was determined by comparing these cereals with equivalent control samples. The results are indicated in the table below.

TABLE I.—SOG INDEX FOR "ORGAN-O-SIL" TREATED CEREALS

| Cereal | Treated-$T_t$, time (in min.) to reach 2 gm. milk/gm. cereal | Control-$T_c$, time (in min.) to reach 2 gm. milk/gm. cereal | Sog Index, S.I.=$\frac{T_t}{T_c}$ |
| --- | --- | --- | --- |
| Corn and rice flakes | 30 | 5 | 6.0 |
| Corn flakes | 31 | 4 | 7.8 |
| Sugar coated corn flakes | 33 | 17 | 1.9 |
| Wheat flakes | 4-5 | 4-5 | 1 |
| Wheat cereal | 22 | 8 | 2.8 |
| Wheat and wheat bran | 15 | 2 | 7.5 |
| Oat, soy and wheat flour | 12 | 5 | 2.4 |
| Rice, corn, oats and wheat | 20 | 12 | 1.7 |

EXAMPLE II

A corn flake cereal was treated as in Example I with two different hydrophobic silicas. The first of these was "Aerosil" R 972. "Aerosil" is a trademark of Degussa Inc., 609 Schuyler Avenue, Kearny, N.J., and is a submicroscopic pyrogenic silica made at 1100° C. and having a high surface area. The physical characteristics of "Aerosil" are as follows. (The silicon dioxide plus methyl content is 99.8% of the total.)

Specific surface (BET)—120±30 m.$^2$/g.
Average particle size—20 millimicrons
Carbon content, approximately—1.2–1.6%
Loss at 110° C.—0.1–0.2%
Ignition loss (1100° C.)—0.7–1.0%
pH (4% dispersion in methanol/water 1:1)—3.6–4.0
HCl—0.01–0.03%
$Al_2O_3$—<0.05%
$TiO_2$—<0.03%
$Fe_2O_3$—<0.003%
Bulk density—2–3 lbs./cu. ft.

"Aerosil" R 972 produced a "sog index" almost double that of "Organ-O-Sil" treated corn flakes. The other precipitated methylated pyrogenic silica tried was "Quso" M 50. "Quso" is a trademark for a series of micro-fine precipitated amorphous silicas having a fully hydroxylated surface. "Quso" M 50 is a product of the Philadelphia Quartz Company and is a treated silica of the "Quso" class to make the normally hydrophilic silica hydrophobic. The physical constants are as follows:

Form, ultra-fine powder, particle size—15 millimicrons
Surface area (nitrogen absorption method)—150 m.$^2$/g.
pH (1:1 isopropanol/water, KCl added to water)—8
Bulk density—7 lbs./cu. ft.
Loss on ignition at 1000° C.—6% by weight
Composition (SiO$_2$ weight)—85%
Water repellency (silica remaining after extraction with water)—100%
Viscosity (10% loading in Gulf No. 560 oil, Brookfield spindle #2, 10 r.p.m.) at 25° C.—160 centipoises "Quso" M 50 proved to be about half as effective as "Organ-O-Sil" treated corn flakes as measured by the "sog index." There is, as is apparent from the above description, a large variance in hydrophobic properties due to the choice of hydrophobing agent. While the particle sizes for the three agents given above are approximately identical, there are differences in loss of ignition for the three silicas. This difference might indicate that under high heat, the surface hydroxyl groups are being converted to siloxane bonds, i.e. —Si—O—Si—. It is possible, also, that the high weight loss for "Quso" M 50 indicates a higher surface hydroxyl group concentration or a higher amount of absorbed water on the surface due to this hydroxyl concentration. The presence of a large number of of surface hydroxyls might indicate that fewer organic groups are present on the silica surface, resulting in a reduction of the binding efficiency.

EXAMPLE III

Dichlorodimethylsilane was applied to the surface of corn flakes and wheat flakes by dissolving the silane in ethyl ether and spray coating. After treatment the corn flakes showed a "sog index" of 4.2 and the wheat flakes showed a "sog index" of 1.7.

It is believed that the reaction of the dichlorodimethylsilane is with the free hydroxyl groups on the surface of the cereal flake or with available water rather than by Van der Waal's forces as in the case of the methylated silicas.

EXAMPLE IV

Wheat flakes were coated as in Example III with diphenyldimethoxysilane. The diphenyldimethoxysilane coated wheat flakes gave a "sog index" number of 1.7. While it is possible to add the hydrophobic siliceous material in this manner, it is preferred to use the methyl silicas because it is easier to coat the flakes by a shaking or dusting step.

EXAMPLE V

Wheat flakes were treated by spraying a thin coating of stearic acid from a 0.5% ether solution. The wheat flakes were dried and the weight gain of stearic acid was found to be 0.450 gm./100 gm. of wheat flakes. A sog test was made as described in Example I and no "sog index" was derived because at the end of 45 minutes, less than 1 gram of milk had been taken compared with flakes which had merely received a stearic acid treatment. It was found that the stearic acid had almost no measurable effect in terms of a "sog index" value as compared to the untreated flake.

EXAMPLE VI

Example V was repeated using an acylated monoglyceride of stearic acid. The amount of stearic acid added was approximately 0.312 gm./100 gm. of wheat flakes. This treatment showed an uptake of about 1.5 gm. of milk per gram of flakes after about 40 minutes. This is compared with a control treated with the acylated monoglyceride which was virtually identical with the untreated wheat flakes.

The surface characteristics of the grain therefore seem to have a pronounced effect on the hydrophobicity of the cereal after treatment with a siliceous material. It is believed that the surface effect is related to the binding of particularly the methylated silica compounds. It is possible that some of the binding may take place on the hydrophobic fraction of the cereal. As should be noted the corn cereals had proven to be, in general, the most effective in response to hydrophobic treatment. However, there are some wheat cereals which respond in much the same manner. In order to test the effect of protein on the hydrophobicity of a cereal treated with a methylated silica, the following example was performed.

EXAMPLE VII

Wheat flakes were enrobed with an aqueous ethanol solution of zein, a corn protein. "Organ-O-Sil" was then applied as in Example I. The "sog index" was taken both for the "Organ-O-Sil" treated flakes and for the flakes which were treated only with the zein protein. A "sog index" of 5 was found for the "Organ-O-sil" treated flakes as compared to 2.7 for the zein coating alone.

EXAMPLE VIII

Example VII was repeated except that a polar gliadin protein fraction of wheat gluten was substituted for the zein protein. The gliadin treated wheat flakes showed a "sog index" number of 3.1. The wheat flakes treated with both "Organ-O-Sil" and gliadin showed the same "sog index" number.

EXAMPLE IX

Two samples of wheat flakes were treated with an aqueous sodium caseinate solution. One part of the treated flakes was then treated with "Organ-O-Sil." The wheat flakes treated with sodium caseinate and "Organo-O-Sil" showed a "sog index" number of 3.1. Wheat flakes plus sodium caseinate gave a "sog index" of 0.7.

It is not intended that this disclosure be limited to any theory, but from the examples above, it is obvious that some benefit can be garnered by treatment of a wide variety of cereals. It is even possible to get measurable benefit treatment of a pre-sweetened ready-to-eat breakfast cereal. The effect of this treatment will depend, among other things, upon the sites available for organic binding of the methylated silica or the ability of the organo-silanes to bind chemically to the available hydroxyl groups added to the surface by the sugar.

Having fully and completely disclosed the product of our invention, we hereby claim:

1. In a ready-to-eat breakfast cereal comprised of a cereal grain which has been treated to at least partially gelatinize the starch; the improvement of said cereal grain comprised of a coating of a hydrophobic siliceous material on the surface of said cereal in amounts sufficient to decrease the rate of moisture absorption when the cereal is placed in an aqueous environment, said material being in a finely divided solid form, said breakfast cereal being coated with an edible protein containing agent to improve the effect of the hydrophobic siliceous material.

2. A process for the treatment of a ready-to-eat breakfast cereal to increase the hydrophobic properties of said cereal, said process comprising the steps of applying a coating of an edible protein containing agent to the cereal, and adherently coating the surface of the cereal with a hydrophobic siliceous material, said material being in a finely divided solid form, said protein contaning agent increasing the bonding ability of said cereal for the siliceous materal.

3. In a ready-to-eat breakfast cereal comprised of a cereal grain which has been treated to at least partially gelatinize the starch; the improvement of said cereal grain comprised of a coating of a hydrophobic siliceous material on the surface of said cereal in amounts sufficient to decrease the rate of moisture absorption when the cereal is placed in an aqueous environment, said material being in a finely divided solid form, said readyto-eat breakfast cereal being coated with a protein containing agent to improve the effect of the hydrophobic siliceous material, said agent being zein.

4. The product of claim 3 wherein said siliceous material is prepared by the reaction of a silane with finely divided silica.

5. A process for the treatment of a ready-to-eat breakfast cereal to increase the hydrophobic properties of said cereal, said process comprising the steps of applying a coating of a protein containing agent to the cereal, said agent being zein, and adherently coating the surface of the breakfast cereal with a hydrophobic siliceous material, said material being in a finely divided solid form, said protein containing agent increasing the binding ability of said cereal for the siliceous material.

6. The process of claim 5 wherein said siliceous material is prepared by the reaction of a silane with finely divided silica.

References Cited
UNITED STATES PATENTS

| | | | |
|---|---|---|---|
| 2,474,704 | 6/1949 | Thayer | 99—166X |
| 3,484,250 | 12/1969 | Vallenk et al. | 99—83 |

RAYMOND N. JONES, Primary Examiner

PO-1050
(5/69)

UNITED STATES PATENT OFFICE
CERTIFICATE OF CORRECTION

Patent No. 3,595,670            Dated July 27, 1971

Inventor(s) John F. Maloney, Jr., and Theodore W. Craig

It is certified that error appears in the above-identified patent and that said Letters Patent are hereby corrected as shown below:

Column 3, line 51, delete "ceral" and insert ---cereal---.
Column 4, line 7, delete "Organ-O Sil" and insert ---Organ-O-Sil---. Column 5, line 28, delete "of" (second occurrence).
Column 5, line 60, after "taken" insert ---up per gram of cereal by the coated wheat flakes. This was---. Column 6, line 19, delete "Organ-O-sil" and insert ---Organ-O-Sil---.
Column 6, line 33, delete "Organo-O-Sil" and insert ---Organ-O-Sil---. Column 6, line 65, delete "contaning" and insert ---containing---.

Signed and sealed this 4th day of January 1972.

(SEAL)
Attest:

EDWARD M. FLETCHER, JR.        ROBERT GOTTSCHALK
Attesting Officer               Acting Commissioner of Patents